United States Patent Office 3,458,540
Patented July 29, 1969

3,458,540
PROCESS FOR THE PREPARATION OF
17-ETHYNYL-19-NOR STEROIDS
Robert Joly, 8 Rue Chevalier, Montmorency, France;
Julien Warnant, 16 Place du Marche, Neuilly-sur-Seine,
France; and Armand Guillemette, 17 Ave. de l'Alsace
Lorraine, Noisy-le-Sec, France
No Drawing. Filed Oct. 18, 1965, Ser. No. 497,555
Claims priority, application France, Nov. 2, 1964,
993,545
Int. Cl. C07c 167/20, 169/10
U.S. Cl. 260—397.4           4 Claims

ABSTRACT OF THE DISCLOSURE

A process for the selective ethynylation of a $\Delta^{5(10)}$-estrene-3,17-dione in the 17 position which comprises subjecting said $\Delta^{5(10)}$-estrene-3,17-dione to an ethynylation agent selected from the group consisting of (1) acetylene in the presence of liquid ammonia and an alkali metal and (2) acetylene in the presence of an alkali metal tertiary-lower alkanolate, in the presence of an organic solvent at a temperature from about —75° C. to about 50° C., and recovering said 17α-ethynyl-$\Delta^{5(10)}$-estrene-17β-ol-3-one having known utility.

---

The present invention relates to a process for the preparation of 17α-ethynyl-$\Delta^{5(10)}$-estrene-17β-ol-3-one of the formula

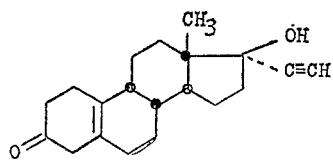

It has now been found, in a totally unexpected manner, that it is possible to directly ethynylate $\Delta^{5(10)}$-estrene-3,17-dione without previously blocking the ketone in the 3-position by a customary blocking agent.

In United States patent application No. 452,879, now U.S. Patent No. 3,332,968 commonly assigned, it was pointed out that to selectively ethynylate the ketonic group in the 17-position of a 17-keto steroid, containing in its molecule other reactive ketonic groups unconjugated with a double bond, in particular a ketonic group in the 3-position, it was previously considered necessary to introduce these groups only later or to protect them transitorily, particularly in form of ketals.

The object of the said United States patent application Serial No. 452,879 resides in the fact that it showed that it was possible to omit this protection for the ketonic group in the 3-position of the 13β-R-$\Delta^{5(10),9(11)}$-gonadiene-3,17-diones, R representing an alkyl group having from 1 to 4 carbon atoms, and, by selective ethynylation of the ketonic function in the 17-position, to proceed directly to the 17α-ethynyl-13β-R-$\Delta^{5(10),9(11)}$-gonadiene-17β-ol-3-ones.

The process of the said United States patent application Serial No. 452,879 consisted in subjecting a 13β-R-$\Delta^{5(10),9(11)}$-gonadiene-3,17-dione to ethynylation by means of acetylene and an alkali metal, such as potassium in liquid ammonia or by means of acetylene and an alkali metal alcoholate of a tertiary alkanol, such as potassium t-butylate or tert.-amylate, and to obtain directly the corresponding 13β-R-17α-ethynyl-$\Delta^{5(10),9(11)}$-gonadiene-17β-ol-3-one.

It has previously been reported that 17α-ethynyl-$\Delta^{5(10)}$-estrene-17β-ol-3-one can be prepared starting from the methyl ether of estradiol, by the intermediate of the methyl ether of dihydroestrone (United States Patent No. 2,725,389).

An object of the present invention is the development of a process for the production of 17α-ethynyl-$\Delta^{5(10)}$-estrene-17β-ol-3-one which comprises the steps of ethynylating $\Delta^{5(10)}$-estrene-3,17-dione by the action of an ethynylating agent selected from the group consisting of (1) acetylene in the presence of liquid ammonia and an alkali metal and (2) acetylene in the presence of an alkali metal tertiary-lower alkanolate, in the presence of an organic solvent at temperatures from about —75° C. to about 50° C., and recovering said 17α-ethynyl-$\Delta^{5(10)}$-estrene-17β-ol-3-one.

This and other objects of the invention will become apparent as the description thereof proceeds.

It has now been discovered that it is possible to directly effect the ethynylation of $\Delta^{5(10)}$-estrene-3,17-dione without the ketone in the 3-position being previously protected by a conventional blocking agent, similarly as when a $\Delta^{5(10),9(11)}$-diene is employed as a starting compound.

The process, object of the present invention, is characterized in that $\Delta^{5(10)}$-estrene-3,17-dione is subjected to a selective ethynylation by means of (1) acetylene and an alkali metal, such as potassium, in liquid ammonia, or (2) acetylene and an alkali metal tertiary-lower alkanolate, such as potassium t.-butylate or potassium t.-amylate. The reaction is carried out in the presence of an excess of the alkali metal or the alkali metal tertiary-lower alkanolate, according to the reactant utilized, and in the presence of organic solvents, such as benzene, toluene, ether, tetrahydrofuran, etc.

According to an advantageous method of execution of the invention, the ethynylation is effected with an alkali metal acetylide, such as that of potassium, in liquid ammonia and ether at a temperature between about —50° C. and about 0° C., preferably at about —35° C. The product formed is isolated by the addition to the reaction media of an ammonium salt of an inorganic acid, such as ammonium chloride, or a weak inorganic acid, such as carbon dioxide. Water is added to the reaction mixture and the product is extracted with a water-immiscible solvent, such as methylene chloride.

The following example will serve for better comprehension of the invention without, however, limiting its characteristics.

Example

At a temperature of —35° C. 60 cc. of ammonia were condensed and 1.72 gm. of potassium were added thereto. Acetylene was allowed to bubble through the solution until a total decolorization of the solution was obtained. While maintaining the bubbling of acetylene through the solution, first 20 cc. of diethyl ether, then 4 gm. of $\Delta^{5(10)}$-estrene-3,17-dione were added. For 4 hours at —35° C. the agitation was continued while bubbling a small amount of acetylene therethrough.

Next, in small fractions, 8 gm. of ammonium chloride were added to the reaction medium and the solution was agitated for 15 minutes. 20 cc. of methylene chloride were added, and the reaction mixture was poured under agitation into a mixture of:

| | |
|---|---|
| Water _____cc__ | 200 |
| Ammonium chloride _____gm__ | 4 |
| Methylene chloride _____cc__ | 20 |

The methylene chloride phase was separated and the aqueous phase was re-extracted with methylene chloride.

The methylene chloride phase and wash liquor were combined, washed with water, dried and concentrated to a volume of 40 cc. The concentrated solution was agitated for 30 minutes with 5 gm. of neutral alumina, filtered and concentrated to dryness under vacuum. The crystallized residue was purified by trituration at reflux with 12 cc. of isopropyl ether for 15 minutes. Then the product was cooled, vacuum filtered and dried at 40° C. under vacuum. 3.94 gm. of 17α-ethynyl-$\Delta^{5(10)}$-estrene-17β-ol-3-one were obtained, having a melting point of 181° C. and a specific rotation $[\alpha]_D^{20} = +120°$ (c.=1% in dioxane).

The preceding specific embodiment is illustrative of the invention. It is to be understood, however, that other expedients known to those skilled in the art or described herein may be employed without departing from the spirit of the invention.

We claim:

1. A process for the production of 17α-ethynyl-$\Delta^{5(10)}$-estrene-17β-ol-3-one which comprises the steps of ethynylating $\Delta^{5(10)}$-estrene-3,17-dione by the action of an ethynylating agent selected from the group consisting of (1) acetylene in the presence of liquid ammonia and an alkali metal and (2) acetylene in the presence of an alkali metal tertiary-lower alkanolate, in the presence of an organic solvent at temperatures from about −75° C. to about 50° C., and recovering said 17α-ethynyl-$\Delta^{5(10)}$-estrene-17β-ol-3-one.

2. The process of claim 1 wherein said ethynylating agent is acetylene in the presence of an excess of potassium in liquid ammonia.

3. The process of claim 1 wherein said recovery is effected by adding an agent selected from the group consisting of weak inorganic acids and ammonium salts of inorganic acids, adding water and extracting the aqueous mixture with a water-immiscible solvent.

4. The process of claim 3 wherein said agent is ammonium chloride.

References Cited

UNITED STATES PATENTS

| | | | |
|---|---|---|---|
| 2,888,471 | 5/1959 | Sondheimer | 260—397.4 |
| 3,041,359 | 6/1962 | Ringold et al. | 260—397.3 |
| 3,332,968 | 7/1967 | Joly et al. | 260—397.3 |
| 3,346,601 | 10/1967 | Wettstein et al. | 260—397.4 |

LEWIS GOTTS, Primary Examiner

E. G. LOVE, Assistant Examiner

PO-1050
(5/69)

UNITED STATES PATENT OFFICE
CERTIFICATE OF CORRECTION

Patent No. 3,458,540      Dated July 29, 1969

Inventor(s) Robert Joly, Julien Warnant and Armand Guillemette

It is certified that error appears in the above-identified patent and that said Letters Patent are hereby corrected as shown below:

Column 1, between lines 7 and 8, please insert

-- assignors to Roussel Uclaf, Paris, France, a corporation of France --

SIGNED AND
SEALED
FEB 17 1970

(SEAL)
Attest:

Edward M. Fletcher, Jr.
Attesting Officer

WILLIAM E. SCHUYLER, JR.
Commissioner of Patents